US012630396B2

(12) United States Patent
Ding et al.

(10) Patent No.: US 12,630,396 B2
(45) Date of Patent: May 19, 2026

(54) CONTROLLER FOR LIFTING PLATFORM AND LIFTING PLATFORM

(71) Applicant: ZHEJIANG JIECANG LINEAR MOTION TECHNOLOGY CO., LTD., Zhejiang (CN)

(72) Inventors: Miaojiang Ding, Zhejiang (CN); Yong Ma, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 1304 days.

(21) Appl. No.: 17/624,847

(22) PCT Filed: Dec. 20, 2018

(86) PCT No.: PCT/CN2018/122212

§ 371 (c)(1),
(2) Date: Jan. 5, 2022

(87) PCT Pub. No.: WO2020/124464

PCT Pub. Date: Jun. 25, 2020

(65) Prior Publication Data

US 2022/0289524 A1 Sep. 15, 2022

(51) Int. Cl.
*B66B 13/14* (2006.01)

(52) U.S. Cl.
CPC .................................. *B66B 13/143* (2013.01)

(58) Field of Classification Search
CPC .... B66B 13/143; B66B 13/14; H05K 5/0247; B66F 3/44; B66F 9/075; B66F 9/20; B66F 9/205; B66F 9/24

(Continued)

(56) References Cited

U.S. PATENT DOCUMENTS 4,714,025 A * 12/1987 Wallin ................... A47B 17/02 340/870.38
5,445,245 A * 8/1995 Ketoviita .............. B66B 5/0006 187/247

(Continued)

FOREIGN PATENT DOCUMENTS

CN 202818824 3/2013
CN 204302694 4/2015

(Continued)

OTHER PUBLICATIONS

"International Search Report (Form PCT/ISA/210) of PCT/CN2018/122212," mailed on Apr. 11, 2019, with English translation thereof, pp. 1-4.

(Continued)

*Primary Examiner* — Sarang Afzali
*Assistant Examiner* — Darrell C Ford
(74) *Attorney, Agent, or Firm* — JCIPRNET

(57) ABSTRACT

A controller for a lifting platform and a lifting platform are provided. The lifting platform includes a lateral beam and actuators, two actuators being provided and respectively disposed at two ends of the lateral beam. The controller includes a control box and a circuit board provided in the control box. The circuit board is connected with the actuators via wires, and a backside of the control box is connected to the lateral beam. Openings facilitating connection between the wire and the circuit board are arranged on the control box, and at least one of the openings is provided at a frontside of the control box.

6 Claims, 5 Drawing Sheets

(58) Field of Classification Search
USPC ................................ 187/361, 247, 276, 288
See application file for complete search history.

(56) References Cited

U.S. PATENT DOCUMENTS

| | | | | |
|---|---|---|---|---|
| 5,779,366 | A * | 7/1998 | McKenzie, III .......... | G06F 1/16 383/41 |
| 5,896,953 | A * | 4/1999 | Horne ..................... | B66B 13/16 187/335 |
| 6,352,037 | B1 * | 3/2002 | Doyle ...................... | A47B 9/00 108/50.02 |
| 6,360,675 | B1 * | 3/2002 | Jones ....................... | A47B 9/00 108/50.02 |
| 12,403,390 | B2 * | 9/2025 | Che ....................... | A63F 9/1044 |
| 2005/0167183 | A1 | 8/2005 | Tominaga et al. | |
| 2008/0236955 | A1 * | 10/2008 | Kattainen ............. | B66B 13/146 187/316 |
| 2013/0199419 | A1 * | 8/2013 | Hjelm ...................... | A47B 9/00 318/520 |
| 2015/0282605 | A1 * | 10/2015 | Wu .......................... | A47B 9/00 248/188.2 |
| 2017/0042322 | A1 * | 2/2017 | Labrosse ................ | A47B 21/02 |
| 2017/0238696 | A1 * | 8/2017 | Ehrreich .................. | A47B 9/20 |
| 2018/0103753 | A1 * | 4/2018 | Davidsen ................. | A47B 1/08 |

FOREIGN PATENT DOCUMENTS

| | | |
|---|---|---|
| CN | 204305505 | 4/2015 |
| CN | 204951800 | 1/2016 |
| CN | 206137515 | 5/2017 |
| EP | 0911752 | 4/1999 |
| EP | 2159131 | 3/2010 |
| JP | 2010057345 | 3/2010 |

OTHER PUBLICATIONS

"Search Report of Europe Counterpart Application", issued on Oct. 11, 2022, pp. 1-6.

* cited by examiner

CONTROLLER FOR LIFTING PLATFORM AND LIFTING PLATFORM

CROSS-REFERENCE TO RELATED APPLICATION

This application is a 371 of international application of PCT application serial no. PCT/CN2018/122212 filed on Dec. 20, 2018. The entirety of the above mentioned patent application is hereby incorporated by reference herein and made a part of this specification.

TECHNICAL FIELD

The present disclosure relates to controllers, and more particularly relate to a controller for a lifting platform and a lifting platform.

DESCRIPTION OF RELATED ART

A conventional lifting platform generally leverages a controller to control actuators to bring a lifting column to lift and lower, where the controller and the actuators are connected via wires. To optimize wire length, an opening for the wires to access is usually arranged at a lateral side of the controller. When the wires are stressed, the wires are easy to fall off from the controller, causing disconnection between the controller and the actuators and rendering the controller unreliable in use.

SUMMARY

Embodiments of the present disclosure provide a controller for a lifting platform and a lifting platform, which are reliable in use.

The present disclosure adopts the following technical solutions. A controller is adapted for a lifting platform, the lifting platform includes a lateral beam and actuators, and two actuators are provided and respectively disposed at two ends of the lateral beam. The controller includes a control box and a circuit board provided in the control box, the circuit board is connected to the actuators via wires, and a backside of the control box is connected to the lateral beam. Openings facilitating connection between the wire and the circuit board are arranged on the control box, and at least one of the openings is provided at a frontside of the control box.

Furthermore, the circuit board and the actuators are connected via the wire, and terminals for connecting with the wire are provided on the circuit board. The terminals are exposed via the openings.

Furthermore, the control box includes a base plate and a box body, and the control box is insert-fitted onto the lateral beam via the base plate.

Furthermore, a snap-fit buckle is provided on the lateral beam, and a slot fitted with the snap-fit buckle is provided on the base plate.

Furthermore, the slot is positioned on a lateral side of the base plate; or, the slot is disposed on a side of the base plate facing the lateral beam.

Furthermore, the snap-fit buckle and the lateral beam are integrally arranged; or, the snap-fit buckle and the lateral beam are separately arranged.

Furthermore, a slot is arranged on the lateral beam, and a snap-fit buckle fitted with the slot is arranged on the base plate.

Furthermore, the snap-fit buckle is arranged on a lateral side of the base plate; or, the snap-fit buckle is positioned on the side of the base plate facing the lateral beam.

The present disclosure further provides a lifting platform. The lifting platform includes a top, a lateral beam and a lifting column, which are supported underneath the top, an actuator for driving lifting and lowering of the lifting platform, and a controller disposed on the lateral beam. The controller refers to the controller in any of the above technical solutions.

In the present disclosure, the controller box is mounted on the lateral beam and arranged to face downward. The “backside of the controller” refers to the side of the control box facing the lateral beam, and the “frontside of the control box” refers to the side of the control box facing the ground.

With the above technical solutions, the present disclosure offers the following advantages.

1. In use, the actuators are disposed at the left and right sides of the control box. If the openings are arranged at the left and right sides of the control box, the wires between the actuators and the control box are easily pulled apart from the circuit board and thus fall off the control box, causing electrical disconnection between the actuators and the controller. In the present disclosure, at least one opening is disposed at the frontside of the control box, such that the actuators are not easily disengaged from the circuit board, rendering a more reliable connection between the control box and the actuators, further rendering the controller more reliable in use.

2. The wires are connected to the circuit board via terminals, wherein the terminals are exposed via the openings, such that the wires are insert-fitted with the terminals to realize connection with the circuit board, rendering wire connection simple and reliable.

3. The control box is insert-fitted onto the lateral beam via the base plate, rendering a simple and convenient connection between the controller and the lateral beam.

4. By providing a snap-fit buckle on the lateral beam and providing a slot on the base plate, or by providing a slot on the lateral beam and providing a snap-fit buckle on the base plate, fitting between the snap-fit buckle and the slot implements connection between the base plate and the lateral beam.

5. The present disclosure further provides a lifting platform, wherein the controller of the lifting platform refers to the controller described above, rendering a reliable connection between the controller and the actuators, further rendering the lifting platform reliable in use.

BRIEF DESCRIPTION OF THE DRAWINGS

Hereinafter, the present disclosure will be described in further detail with reference to the accompanying drawings.

DESCRIPTION OF THE EMBODIMENTS

Hereinafter, the present disclosure will be described in further detail through preferred embodiments with reference to the accompanying drawings. It is understood that the terms such as "upper," "lower," "left," "right," "longitudinal," "transverse," "inner," "outer," "vertical," "horizontal," "top," "bottom," etc. only indicate the orientational or positional relationships based on the drawings, which are intended only for facilitating or simplifying description of the present disclosure, not for indicating or implying that the devices/elements must possess those specific orientations or must be configured and operated with those specific orientations; therefore, they should not be understood as limitations to the present disclosure.

First Embodiment

Figure 1:
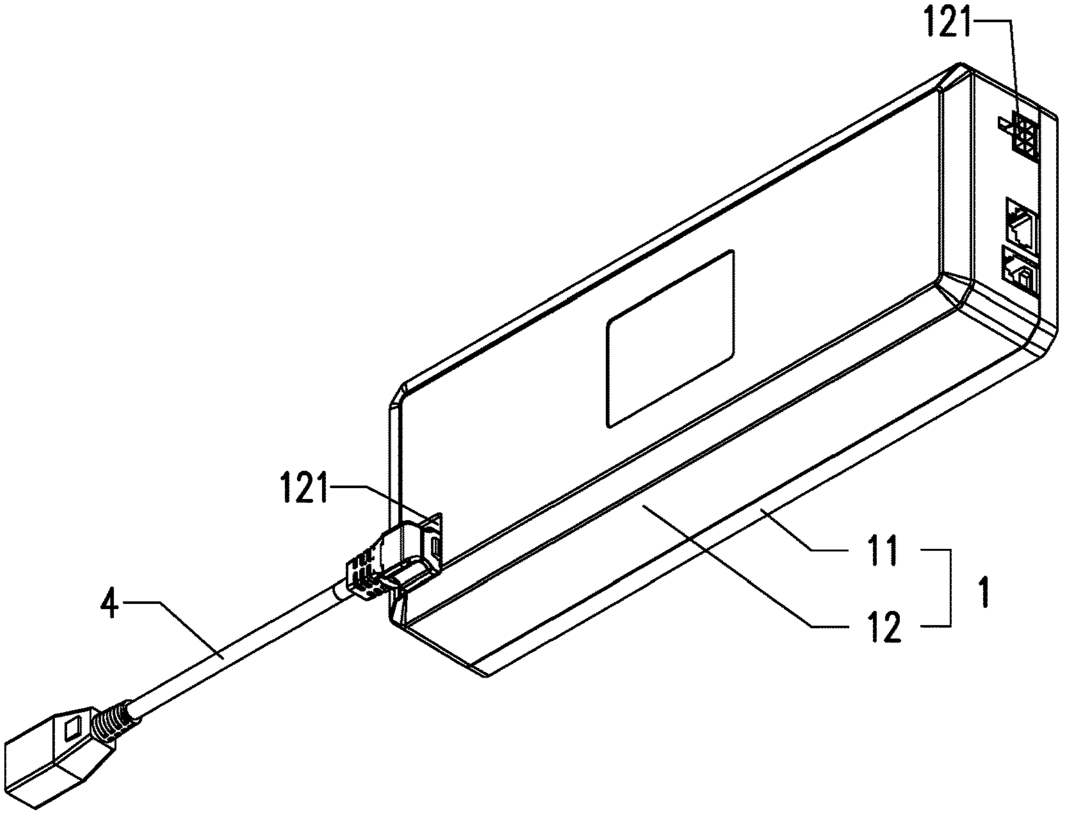
FIG. 1 is a schematic view of fitting between an opening and a wire in a controller according to a first embodiment of the present disclosure.
Figure 2:
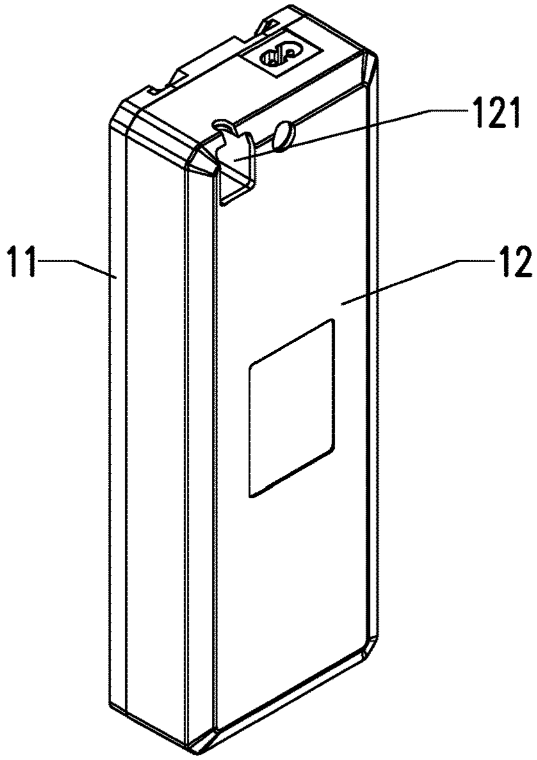
FIG. 2 is a structural schematic view of the controller according to the first embodiment of the present disclosure.
Figure 3:
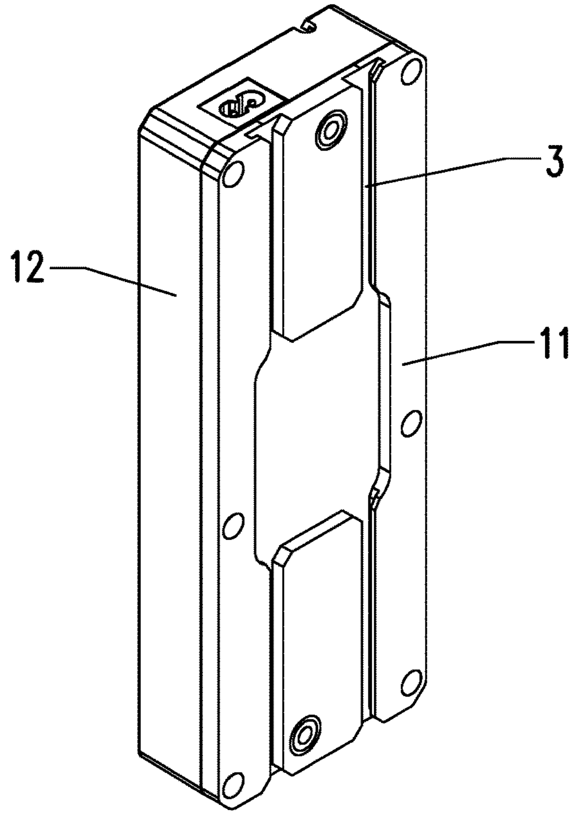
FIG. 3 is a structural schematic view from another direction of the controller according to the first embodiment of the present disclosure.

As illustrated in FIG. 1 to FIG. 3, the present disclosure provides a controller for a lifting platform. The lifting platform includes a lateral beam and actuators. Two actuators are provided and respectively disposed at two ends of the lateral beam. The controller comprises a control box 1 and a circuit board provided in the control box 1. The control box 1 are arranged to face downward. The backside of the control box 1, i.e., the side of the control box facing the lateral beam, is connected to the lateral beam. Terminals are provided on the circuit board. The circuit board is connected to the two actuators via two wires 4, respectively. Two openings 121 are arranged on the control box 1, and the terminals are exposed via the openings. The two openings are respectively arranged for the two wires to pass therethrough, such that the wires are connected to the terminals. One of the openings is provided at the frontside of the control box, i.e., the side facing the ground, and the other one of the openings is provided on a lateral side of the control box. In this way, in use, because the two wires are disposed on the left and right sides of the control box, respectively, the wires, when being pulled, are not easily disengaged from the circuit board, rendering a more reliable connection between the control box and the actuators, and further rendering the controller more reliable in use.

In this embodiment, the control box 1 comprises a base plate 11 and a box body 12. The control box is insert-fitted onto the lateral beam via the base plate, rendering mounting of the control box simpler and more convenient. A snap-fit buckle is provided on the lateral beam, and a slot 3 fitted with the snap-fit buckle is provided on the base plate 11. The slot is arranged at the side of the base plate facing the lateral beam, and the snap-fit buckle and the lateral beam are integrally arranged.

Specifically, the slot 3 refers to an inverted L-shaped slot, and the snap-fit buckle refers to an L-shaped snap-fit buckle. The snap-fit buckle and the slot are interference-fitted during assembly, such that once being assembled, the fitting between the slot and the snap-fit buckle is not easily disengaged, rendering a more reliable connection between the slot and the snap-fit buckle, and the control box does not easily fall off the lateral beam.

Two L-shaped snap-fit buckles are provided, and four inverted L-shaped slots are provided. The four slots are arranged in a pairwise symmetrical manner, such that the slots for fitting the snap-fit buckles are flexibly selected, and thus the position of the control box on the lateral beam is also flexibly selected.

The present disclosure further provides a lifting platform. The lifting platform includes a top, a lateral beam and a lifting column, which are supported underneath the top, actuators for driving lifting and lowering of the lifting platform, and a controller disposed on the lateral beam. The controller refers to the controller as described in any of the above technical solutions.

Because the connection between the controller and the actuators is more reliable and the connection between the control box and the lateral beam is simpler and more reliable, the lifting platform is also more reliable to use.

It is understood that the slots may also have an inverted "T" shape, and the snap-fit buckles have a "T" shape.

It is understood that it is alternative to arrange only one slot.

It is understood that it is alternative to arrange two slots.

Second Embodiment

Figure 4:
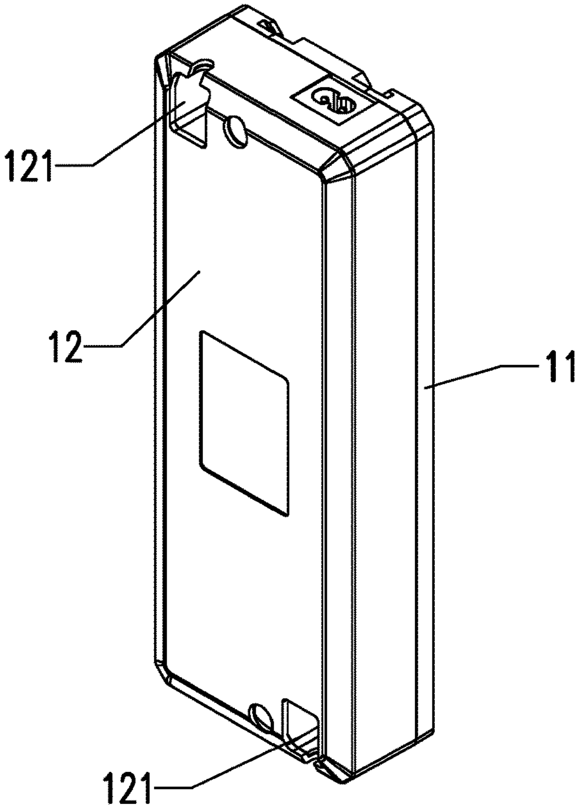
FIG. 4 is a structural schematic diagram of a controller according to a second embodiment of the present disclosure.

As illustrated in FIG. 4, this embodiment differs from First Embodiment mainly in that the two openings 121 are both provided on the frontside of the control box 1, which offers an advantage of providing a more reliable connection between the two wires and the circuit board, thereby further improving reliability of the controller in use.

Third Embodiment

Figure 5:
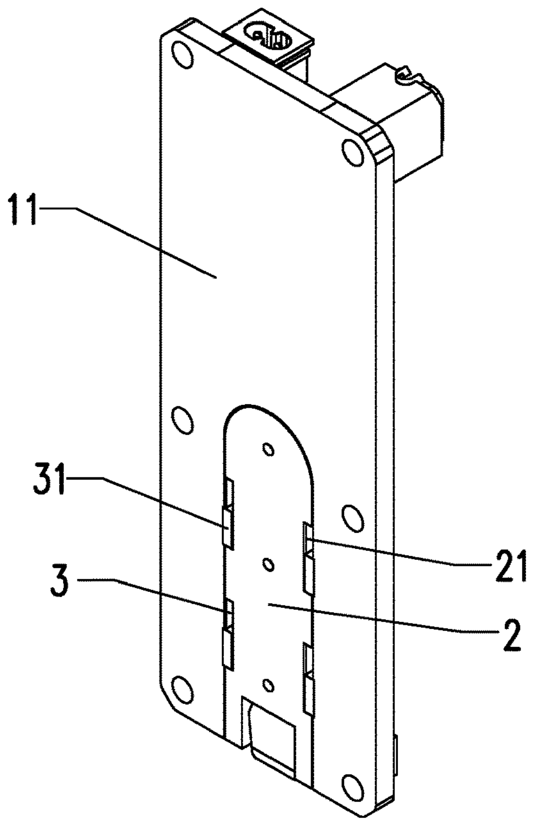
FIG. 5 is a structural schematic view of a base plate in a controller according to a third embodiment of the present disclosure.

As illustrated in FIG. 5, this embodiment differs from the second embodiment mainly in that the snap-fit buckle 2 and the lateral beam are separately arranged, which offers an advantage that the snap-fit buckle may be manufactured integrally with the slot, without a need to machine a snap-fit buckle on the lateral beam, thereby simplifying the manufacturing process of the lateral beam and saving manufacturing costs.

In this embodiment, the slot 3 is a U-shaped slot, and the snap-fit buckle 2 is a U-shaped snap-fit. A stop block 31 is provided on a wall of the slot 3, and a limit notch 21 is provided on a sidewall of the snap-fit buckle 2. The snap-fit buckle 2 is inserted into the slot 3 such that the stop block 31 and the limit notch 21 are fitted to fix the position of the snap-fit buckle.

The snap-fit buckle is in threaded connection with the lateral beam. In use, the snap-fit buckle is removed from the slot and secured to the lateral beam via a bolt, and then the control box is secured to the lateral beam by fitting between the slot and the snap-fit buckle.

It is understood that the slot may also have a square shape, and the snap-fit buckle may also have a square shape.

Fourth Embodiment

Figure 6:
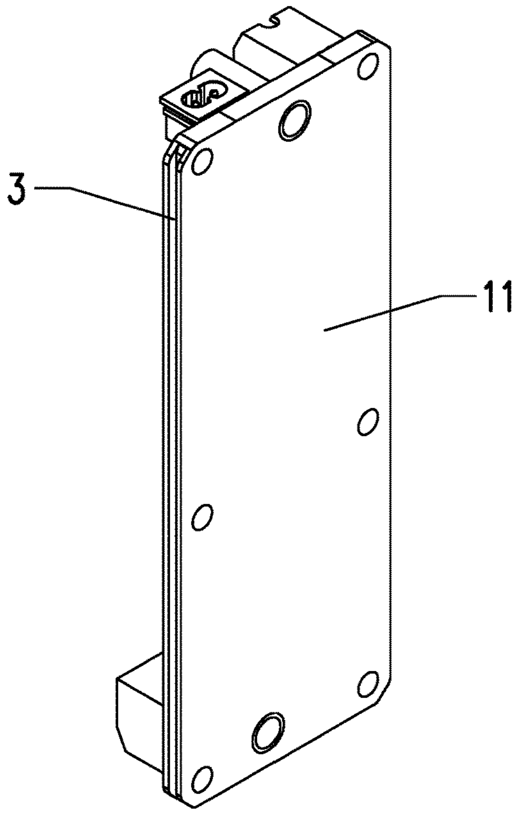
FIG. 6 is a structural schematic view of a base plate in a controller according to a fourth embodiment of the present disclosure.

As illustrated in FIG. 6, this embodiment differs from the second embodiment mainly in that the slot 3 is disposed on a lateral side of the base plate 11. The slot 3 is arranged lengthwise along the base plate, such that the fitting length between the slot and the snap-fit buckle is provided as long as possible to render a more reliable fitting. Meanwhile, the vertical position of the control box is limited by the upper and lower end faces of the slot. In this way, the slot is machined in a relatively simple manner.

Fifth Embodiment

Figure 7:
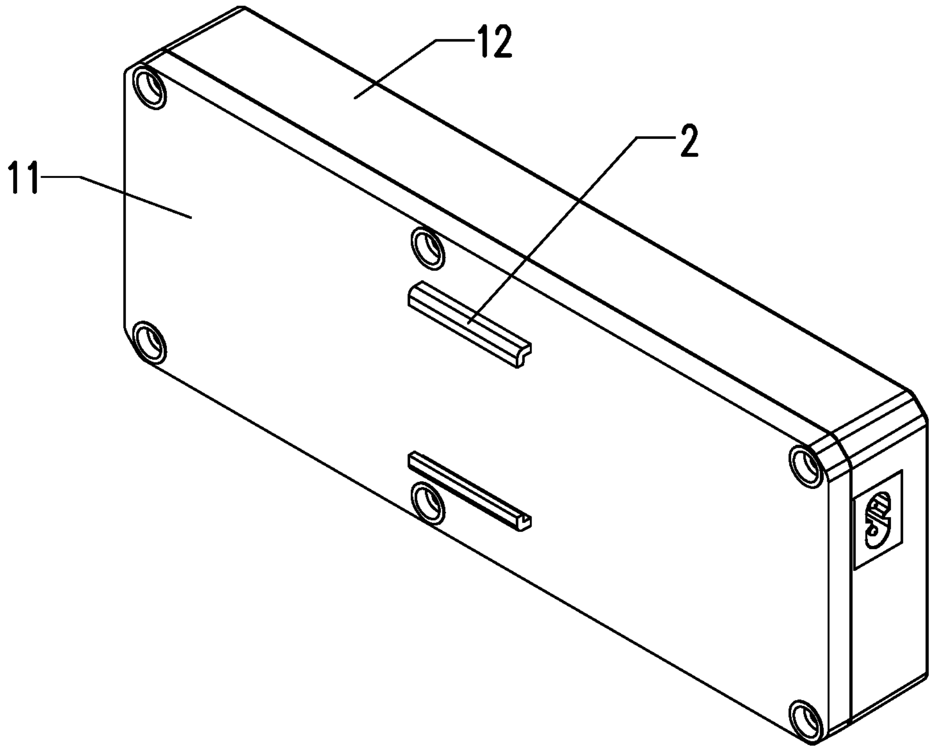
FIG. 7 is a structural schematic diagram of a controller according to a fifth embodiment of the present disclosure.
Figure 8:
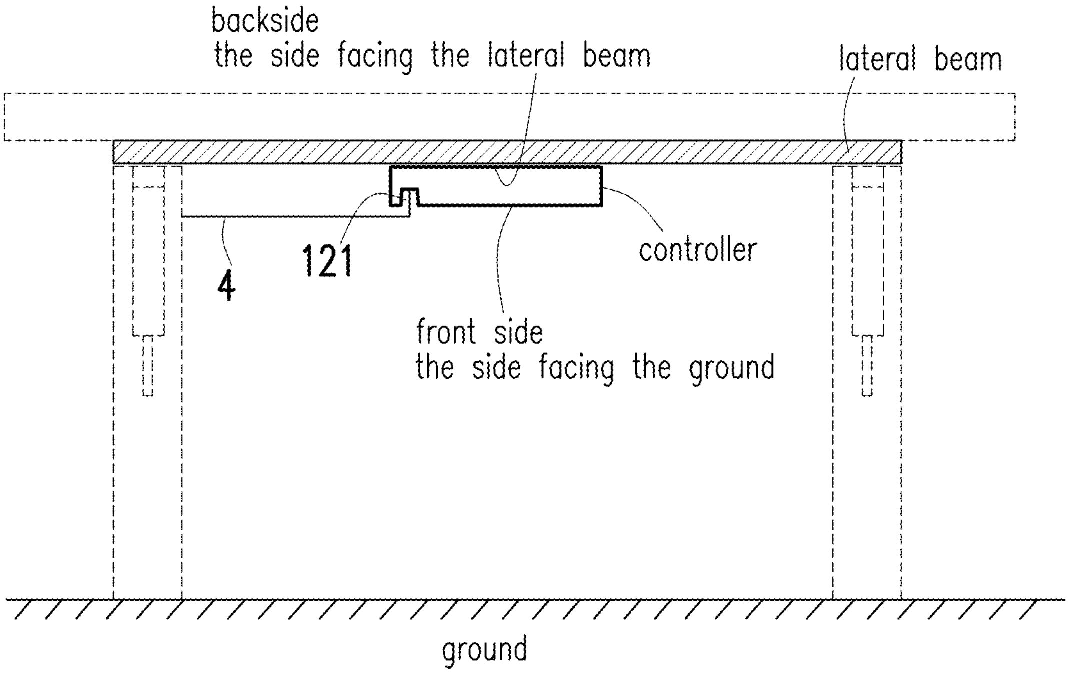
FIG. 8 is a structural schematic diagram of the present application, showing a configuration of a controller with respect to a lateral beam and a ground.

As illustrated in FIG. 7, this embodiment differs from the second embodiment mainly in that the slot is provided on the lateral beam, and a snap-fit buckle 2 fitted with the slot is provided on the base plate.

The slot is provided on the lateral beam. The snap-fit buckle 2 fitted with the slot is provided on the base plate 11. Specifically, the snap-fit buckle is arranged on the side of the base plate facing the lateral beam. The snap-fit buckle is an L-shaped snap-fit buckle, wherein two snap-fit buckles are arranged to achieve a more secure fitting between the snap-fit buckles and the slot.

It is understood that the snap-fit buckle may also be arranged on a lateral side of the base plate.

Besides the preferred embodiments above, the present disclosure further has other embodiments. Those skilled in the art may make various alterations and transformations based on the present disclosure, which should all fall into the scope defined by the appended claims of the present disclosure without departing from the spirit of the present disclosure.

What is claimed is:

1. A lifting platform, comprising a top, a lateral beam and a lifting column supported underneath the top, two actuators for driving lifting and lowering of the lifting platform, and a controller disposed on the lateral beam, wherein the two actuators are respectively disposed at two ends of the lateral beam, wherein the controller comprises a control box and a circuit board provided in the control box, circuit board is connected to the actuators via wires, a backside of the control box is connected to the lateral beam, two openings for connection between the wire and the circuit board are arranged on the control box, and at least one of the openings is provided at a frontside of the control box, wherein the backside of the control box refers to a side of the control box facing the lateral beam, and the frontside of the control box refers to a side of the control box facing a ground and opposite to the backside, two terminals for connecting the wires are provided on the circuit board, and the terminals are respectively exposed via the openings, one of the wires is vertically connected to a corresponding one of the terminals through the opening provided at the frontside of the control box, the control box includes a base plate and a box body, and the control box is insert-fitted onto the lateral beam via the base plate, a snap-fit buckle is provided on one of the lateral beam and the base plate, and a slot fitted with the snap-fit buckle is provided on the other one of the lateral beam and the base plate, the snap-fit buckle is an L-shaped snap-fit buckle, and the slot is an inverted L-shaped slot.

2. The controller according to claim 1, wherein the snap-fit buckle is provided on the lateral beam, and the slot fitted with the snap-fit buckle is provided on the base plate.

3. The controller according to claim 2, wherein the slot is positioned on a lateral side of the base plate; or, the slot is disposed on a side of the base plate facing the lateral beam.

4. The controller according to claim 2, wherein the snap-fit buckle and the lateral beam are integrally arranged; or, the snap-fit buckle and the lateral beam are separately arranged.

5. The controller according to claim 1, wherein the slot is arranged on the lateral beam, and the snap-fit buckle fitted with the slot is arranged on the base plate.

6. The controller according to claim 5, wherein the snap-fit buckle is arranged on a lateral side of the base plate; or, the snap-fit buckle is positioned on a side of the base plate facing the lateral beam.

* * * * *